Patented Mar. 16, 1954

2,672,425

UNITED STATES PATENT OFFICE 2,672,425

HEAT TREATMENT OF HYDROCARBON DRYING OILS

Anthony H. Gleason, Westfield, and Robert F. Leary, Cranford, N. J., assignors to Standard Oil Development Company, a corporation of Delaware No Drawing. Application July 29, 1950, Serial No. 176,772

8 Claims. (Cl. 106—285)

This invention relates to an improvement in drying rate of certain siccative diolefin polymers. In particular, the invention is concerned with a heat treatment for drying oils prepared by copolymerization of 75 to 85% butadiene and 25 to 15% styrene.

The preparation of synthetic drying oils by polymerizing butadiene-1,3 or especially by copolymerizing 75 to 85% butadiene-1,3 and 25 to 15% styrene with the aid of metallic sodium and in the presence of an inert hydrocarbon diluent, and preferably also in the presence of an ether diluent such as dioxane-1,4 is described and claimed in copending application Serial No. 176,- 771 of Anthony H. Gleason, filed July 29, 1950. In the manner described a suitable polymeric drying oil can be produced which, when dissolved in an equal quantity of a hydrocarbon solvent such as mineral spirits, generally has a viscosity between about 0.1 and 20 poises, or about 1,000 to 20,000 poises when diluent-free, corresponding to an intrinsic viscosity range of about 0.15 to 0.4. Where the polymeric oil is to be used in higher concentrations, e. g. 70 to 100%, it is obviously desirable that the polymer have a relatively low viscosity, such as 0.5 to 2 poises. The desired viscosity of the polymer can be controlled by an appropriate change in synthesis temperature, oil viscosities in the range between 0.2 and 0.7 poise being obtainable, for example, at reaction temperatures of about 85 to 95° C., whereas oils having viscosities of 1.5 poises, 10 poises or higher can be prepared at temperatures below 50° C., especially with the proper choice of ether type and concentration. However, the resulting low-viscosity oils have been found to suffer from an unduly slow drying rate. Thus, heretofore, the art has been in a dillemma since the choice of synthesizing a high-viscosity polymer ruled out its use in applications requiring the oil to be substantially solvent free or at least in highly concentrated solutions, whereas the choice of deliberately synthesizing a polymer having the desirable viscosity meant a real sacrifice in the drying properties of the product obtained.

It has now been discovered that by synthesizing the drying oil to a viscosity lower than the one eventually desired, and subsequently heat bodying the oil under specified conditions to the final viscosity, a substantial improvement in drying properties was obtained thereby, as compared with a drying oil synthesized directly to the desired final viscosity. Alternatively, an important aspect of the present invention relates to the discovery that, by a short heat treatment, the drying rate of certain synthetic drying oils can be greatly improved without materially affecting their viscosity. This improvement in drying properties is quite unexpected since it was generally believed by the prior art, which based its experience primarily on natural drying oils of the glyceride type, that changes in drying rates of similar oils were due primarily to differences in viscosity; and, in the case of the glyceride oils, an increased viscosity obtained by heat bodying often has resulted in an actual impairment of drying rate.

In contrast, the present invention is based on the discovery that in the case of the drying oils involved here, as between two polymers of the type described and having an identical chemical constitution as well as identical viscosity, the polymer synthesized directly to the specified viscosity has substantially poorer drying properties than a similar polymer synthesized to an intermediate viscosity and subsequently heat bodied to the specified viscosity. Moreover, it has been discovered that the improvement in drying rates by means of the present invention is most effective in the first stages of the heat bodying treatment, thus permitting improvements in drying rates without great alteration of product viscosity.

The drying oils to which the present invention is primarily applicable are those prepared by copolymerizing 75 to 85 parts of butadiene-1,3 and 25 to 15 parts of styrene. The polymerization is carried out in a reaction diluent at temperatures ranging from 25 to 95° C., or preferably between 40 and 85° C., and is desirably continued until complete conversion of monomers is obtained. About 0.5 to 5 parts, preferably 1 to 3 parts of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about −15 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C. Butane, benzene, cyclohexane and similar inert hydrocarbons are also useful, individually or in admixture with each other. The hydrocarbon diluents are used in amounts ranging from 100 to 500, and preferably 200 to 300 parts per 100 parts of monomers. In other words, the resulting drying oil composition as synthesized normally contains about 20 to 50% of the siccative polymer dissolved in a hydrocarbon solvent. When desired, more concentrated drying oil compositions can be produced from the synthesis product by stripping off excess solvent. For purposes of the present invention it is desirable to concentrate non-volatile matter, i. e. the polymer content of the drying oil composition, to a concentration between 40 and 100%, preferably 50 to 90%, prior to subjecting it to the heat treatment. The use of less concentrated solutions is also feasible, but a longer heat treating time is required to accomplish a comparable improvement in drying rate.

Furthermore, to assure the formation of a product of proper clarity, viscosity and drying rate, it is also desirable to employ in the polymerization about 10 to 40 parts, preferably 20 to 30 parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or diethers of 4 to 8 carbon atoms such as diethyl ether, diethyl ether of ethylene glycol, and diethyl ether of diethylene glycol. Finally, it is also beneficial to use about 5 to 35 weight percent (based on sodium) of an alcohol such as methanol, isopropanol or n-amyl alcohol, especially where the sodium catalyst particles are relatively coarse.

The present invention is based on the discovery that when drying oils of the nature described above are heated at temperatures of about 175 to 275° C., or preferably 220 to 260° C., in the substantial absence of air, the drying rate of the treated oil is rapidly improved. In accordance with the present invention the drying rate of a synthetic oil can thus be improved without necessarily affecting the viscosity of the oil to a pronounced degree, though the viscosity of the oil can also be increased simultaneously to any desired end value, if the heat treating is extended for more prolonged periods. For instance, an unexpected improvement in drying rate can be obtained in less than 1 hour at 245° C. without raising the product viscosity by more than a factor of about 1.5 or less, or the drying rate as well as the viscosity can be raised substantially by more prolonged heating.

The following specific examples are presented to illustrate typical applications and effects of the present invention. All quantities are expressed in this specification and claims on a weight basis unless stated otherwise.

EXAMPLE 1

A 2-liter, stainless-steel reactor was charged with 80 parts of butadiene-1,3, 20 parts styrene, 200 parts of straight-run mineral spirits having a boiling range of 150 to 200° C., 20 parts of dioxane-1,4, 1.5 parts of finely dispersed metallic sodium and 0.2 part of isopropanol. After closing the reactor, this reaction mixture was heated with agitation at 50° C. for 10 hours, whereby complete conversion of monomers was obtained. After cooling to room temperature, the sodium was destroyed by adding glacial acetic acid to the reaction mixture, excess acid was neutralized with ammonia and the resulting salts were separated by filtration. Finally, some solvent was stripped from the filtrate until a drying oil was obtained having a viscosity of 1.1 poises and consisting essentially of equal parts of a viscous butadiene-styrene copolymer and mineral spirits. 0.04 part of cobalt naphthenate and 0.04 part of manganese naphthenate (based on the copolymer) were added to the resulting drying oil, the latter was then poured on thin steel panels to form thin coatings, and the air drying rate of the oil was determined as shown in Table I. The oil proved to be rather slow-drying, the test panels being very sticky after an exposure of 6 hours at room temperature.

Samples of the same drying oil were treated in accordance with the present invention by heating at 250° C. in the absence of air for various lengths of time. The same amounts of cobalt and manganese naphthenate driers were added to the heat treated samples as in the case of the untreated control described previously, and drying rates were again determined as shown in Table I.

*Table I*

| Sample | Heat Treat, Hours | Oil Vis., Poises at 50% N. V. M. | Drying Rate (a) | | | | |
|---|---|---|---|---|---|---|---|
| | | | 1 Hour | 2 Hours | 4 Hours | 6 Hours | 24 Hours |
| Control | None | 1.1 | 9 | 8 | 8 | 8 | 0 |
| 1 | 0.5 | 1.4 | 8 | 8 | 7 | 3 | 0 |
| 2 | 2.0 | 3.4 | 8 | 7 | 7 | 2 | 0 |
| 3 | 3.5 | 7.5 | 7 | 7 | 6 | 1 | 0 |

(a) Rating: 9-wet; 8-very sticky; 7-film just clings to fingers; 6-set to touch; 3-decided tack but dust free; 0-dry, tack free.

Sample 1 shows that a very pronounced improvement in drying rate can be achieved by heating the oil for as little as 0.5 hour at 250° C., without greatly affecting the consistency of the oil thereby. Still further improvements in drying rate, as well as a substantial increase in viscosity can be achieved by more prolonged heating, as shown by samples 2 and 3, it being noted that on the scale used quality differences of even a single point have real practical significance to a paint formulator. For instance, a rating of 7 indicates a film which is pulled off the panel when touched, whereas a rating of 6 indicates a film which, while tacky, is sufficiently set that it is not pulled off on contact.

EXAMPLE 2

A similarly favorable result can be obtained by heat treating oils of even lower initial viscosity, as shown below. In this instance an oil having a viscosity of 0.25 poise at 50% non-volatile matter content was prepared in the same manner as described in Example 1, the only essential difference being that 100 parts of butadiene-1,3 and no styrene was used in the feed, the synthesis was carried out at 95° C., and 4 parts of sodium catalyst per 100 parts of monomer were used.

Samples of this drying oil were heat treated at 250° C. in a closed vessel for varying lengths of time, and the drying rates of the treated samples were compared with the control in the manner described in Example 1. The results shown in Table II were obtained.

Table II

| Sample | Heat Treat, Hours | Oil Vis., Poises at 50% N. V. M. | Drying Rate (a) | | | | |
|---|---|---|---|---|---|---|---|
| | | | 1 Hour | 2 Hours | 4 Hours | 6 Hours | 24 Hours |
| Control | None | 0.25 | 9 | 9 | 9 | 8 | 0 |
| 1 | 4 | 0.5 | 8 | 7 | 0 | 0 | 0 |
| 2 | 4.5 | 0.7 | 7 | 5 | 0 | 0 | 0 |
| 3 | 5 | 1.0 | 7 | 5 | 0 | 0 | 0 |
| 4 | 6 | 4.5 | 8 | 7 | 0 | 0 | 0 |

(a) Scale of rating same as in Example 1, Table I, above.

The data again show that the greatest improvement in drying rate occurs in the initial stages of the heat treatment, at which time the increase in viscosity is almost unnoticeable. Note that all treated samples give a dry, tack free film in 4 hours, whereas the consistency and tackiness of the control film remains essentially unchanged in the same drying interval. The data also illustrate that more extended heat treatment affords a convenient means of greatly raising the viscosity of the oil as well as further improving its drying rate. However, when the heat treatment is continued still longer, eventually a point is reached where the viscosity begins to rise very abruptly and at the same time the drying rate begins to fall off in the manner usually associated with the heat bodying of glyceride type drying oils. This reversion of drying rate is illustrated by sample 4, it being noted, nevertheless, that even this sample has a much faster drying rate than the original control. It is believed that the point of drying rate reversion occurs at a stage where viscosity of the oil approaches gelation.

Obviously, the effective rate of the heat treatment can be increased to any desired value by raising the temperature and thus the drying rate of the oil can be modified to the desired extent in as short a time as is commercially practicable.

EXAMPLE 3

It has been stated earlier herein that a drying oil of a certain viscosity can be obtained either by proper choice of synthesis conditions which will give directly a product having the desired viscosity, or by heat treating an oil which is too thin until the desired viscosity is reached in accordance with the present invention. However, the latter method is much superior to the former because it yields a faster drying product at the same viscosity level. This is illustrated by the following comparison of three oils.

The first oil was prepared by direct synthesis on a pilot-plant scale, following the procedure described in Example 1 above. The second oil was obtained by heat treating the first oil for 3 hours at 250° C. in the absence of air, and the third oil was obtained by direct synthesis in substantially the same manner as the first oil, except that the reaction temperature was maintained at 35° C. The drying rates of the three oils, after addition of 0.04 part of cobalt naphthenate and 0.04 part of manganese naphthenate drier (based on polymer), were determined as described in Example 1, the results being summarized in Table III below.

Table III

| Sample | Viscosity Poise at 50% N. V. M. | Drying Rate d | | | | |
|---|---|---|---|---|---|---|
| | | 1 Hour | 2 Hours | 4 Hours | 6 Hours | 24 Hours |
| 1 a | 1.0 | 8 | 7 | 5 | 3 | 0 |
| 2 b | 2.0 | 6 | 4 | 0 | 0 | 0 |
| 3 c | 2.3 | 8 | 8 | 7 | 5 | 0 | a Direct synthesis at 50° C.
b "Sample 1" oil heat treated for 3 hours at 250° C.
c Direct synthesis at 35° C.
d Scale of rating same as in Example 1, Table I, above.

A comparison of the drying characteristics of the three samples shows that there is no direct relation between viscosity and drying rate of the products involved. In fact, a comparison of the directly synthesized samples 1 and 3 shows that the oil having the higher viscosity actually has a substantially poorer drying rate; and a comparison of samples 2 and 3 shows that, in the case of materials having approximately the same viscosity, the drying rate of the heat treated product is very much superior to that of the directly synthesized sample. Moreover, the data on samples 1 and 2 once again confirm that the drying rate of a given oil can be greatly improved by heat treating.

Incidentally, it must be pointed out here that all drying data are strictly comparable within each individual example of this specification, as all drying tests of each sample were run simultaneously. However, no such exact comparisons are possible from one example to another, as the data of the several examples were determined at different times. The variations in atmospheric conditions, notably the humidity and temperature prevailing during each test period, have a marked effect on the numerical values obtained in the drying rate determinations.

This difference in atmospheric conditions may be one of the principal reasons for the different drying characteristics shown, for instance, for the control sample of Example 1 as compared with the substantially identical sample 1 of Example 3.

EXAMPLE 4

The surprising effectiveness of heat treatment on the synthetic drying oils in accordance with the present invention can be illustrated by comparing it with the effect of a similar heat treatment or the convetnional "heat bodying" as applied to natural glyceride oils.

Table IV

| Oil | Heat Treatment | Viscosity, Poises | Drying Rate* | | | | | |
|---|---|---|---|---|---|---|---|---|
| | | | 1 Hour | 2 Hours | 4 Hours | 6 Hours | 24 Hours | 168 Hours |
| Linseed | None | 0.3 | 9 | 8 | 3 | 1 | 1 | 1 |
| Do | 3 hrs. at 250° C.[b] | 0.5 | 9 | 8 | 3 | 1 | 1 | 1 |
| Do | 7 hrs. at 250° C.[b] | 0.7 | 9 | 9 | 3 | 1 | 1 | 1 |
| Do | 2 hrs. at 296° C.[c] | 3.8 | 9 | 9 | 9 | 3 | 1 | 1 |
| Do | 3 hrs. at 296° C.[c] | 13 | 9 | 9 | 9 | 5 | 1 | 1 |
| Do | 4 hrs. at 296° C.[c] | 63 | 9 | 9 | 9 | 6 | 2 | 1 |
| Synthetic Oil [d] | None | 1.0 at 50% N. V. M. | 9 | 8 | 8 | 8 | 0 | 0 |
| Do | 3 hrs. at 250° C.[b] | 5.5 | 6 | 3 | 0 | 0 | 0 | 0 |

* Scale of rating same as in Example 1, Table I, above; all drying rates determined on samples containing 0.04 part cobalt naphthenate and 0.04 part manganese naphthenate.
[b] Heated in sealed glass tube immersed in oil bath.
[c] Heated in open kettle (conventional "heat bodying").
[d] Oil synthesized as in Example 1.

The above data show that when natural oils such as linseed oil are heated either in the absence of air or in an open kettle, a considerable increase in viscosity is obtained as is well known. However, it is also apparent that such heat bodying, under the comparable conditions used, has a decidedly detrimental effect on the drying rate of the product. In fact, with the drier recipe used, none of the linseed oil samples became completely tack free even after a full week's exposure. Only when the customary increased amounts of drier, including a relatively large amount of lead drier, were added to the linseed oil samples tested, were acceptable drying rates obtained, as evidenced by data not shown here; and even then optimum results for hard, tack-free films were obtained only with linseed oil samples which were bodied in the presence of the customary resins. This is in accordance with prior art knowledge that relatively large amounts of driers, including lead, as well as the presence of a resin, are essential to the formulation of commercially acceptable linseed oil varnishes comparable with the simple polymers of this invention.

In contrast, when the synthetic drying oil was treated in accordance with the present invention as shown, the drying rate of the resulting varnish-like product was greatly improved and a dry film was obtained therefrom at the end of four hours even in the absence of any lead drier, and, of course, in the absence of any added resin. This illustrates the basically non-analogous effect of the heat treatment on the synthetic drying oil as opposed to natural drying oils. It also indicates the great economic advantage of the synthetic oils which require neither the addition of any resin nor of the expensive, and toxic, lead drier.

While the foregoing specification contains a general description of the invention as well as a number of illustrative examples, it will be understood that various modifications not specifically described herein may be made by persons skilled in the art without departing from the scope and spirit of the present invention as defined in the appended claims. For example, the presently described heat treatment may be carried out simultaneously with a chemical modification of the siccative polymer as described in copending application Serial No. 106,487, filed July 23, 1949, and in Serial No. 102,703, filed July 1, 1949. Also, while the invention has been demonstrated herein with butadiene oils prepared by the sodium polymerization technique, it is apparent that improvements in drying rate of polymeric diolefin oils can be obtained in a similar manner in the case of oils prepared, for example, by the emulsion polymerization technique described in U. S. Patent 2,500,983, or by the homogeneous peroxide polymerization technique described in U. S. patent application Serial No. 782,850, filed on October 29, 1947 by Arundale et al., now Patent No. 2,586,594.

We claim:

1. A process for improving the drying rate of a synthetic drying oil, which process comprises heating in a closed zone, in the absence of oxygen, and at a temperature between about 220 and 260° C., a solution containing a drying oil copolymer of 75 to 85% butadiene and 25 to 15% styrene in a hydrocarbon solvent having a boiling range between about 90 and 200° C., said solution containing about 50 to 90% of the copolymer and the copolymer having an initial viscosity between 1000 and 20,000 poises on a diluent-free basis.

2. A process according to claim 1 wherein the heating step has a duration of about ½ to 1 hour, whereby the drying rate of the resulting product is improved while accompanied by only a slight increase in viscosity.

3. A process for improving the drying rate of a synthetic drying oil, which process comprises heating, in the absence of air and at a temperature between 220 and 245° C., a solution of a butadiene-styrene drying oil copolymer in a hydrocarbon solvent; the solution having been prepared by heating a mixture of 75 to 85 parts of butadiene, 25 to 15 parts of styrene, 200 to 300 parts of hydrocarbon diluent and 20 to 30 parts of a member selected from the group consisting of aliphatic ethers of 4 to 8 carbon atoms and cyclic diethers of 4 to 8 carbon atoms in the presence of finely divided sodium at a temperature between 40 and 85° C., destroying the catalyst and separating it from the resulting reaction product, and stripping said product to obtain a solution having a polymer content of 40 to 90%, said solution having a viscosity of about 1 to 10 poises when measured at 50% polymer content.

4. A process for preparing a drying oil which comprises copolymerizing a mixture of from 75 to 85% of butadiene and 25 to 15% of styrene in 200 to 300 parts of a hydrocarbon diluent per 100 parts of monomers and 20 to 30 parts of a member of the group consisting of aliphatic ethers of 4 to 8 carbon atoms and cyclic diethers of 4 to 8 carbon atoms, in the presence of 0.5 to 5 parts of finely divided sodium at a temperature between 40 and 85° C., continuing the polymerization until substantially 100% conversion is obtained where a product is obtained which has a viscosity somewhat less than that ultimately desired, killing and removing the catalyst and then heating the product in the absence of air at a temperature between 175 and 275° C. until a drying oil having the desired viscosity is obtained.

5. As a new composition of matter, a liquid copolymer drying oil consisting of about 75 to 85 parts of combined butadiene-1,3, and about 25 to 15 parts of styrene said copolymer having been synthesized to an intrinsic viscosity below that ultimately desired and then subsequently heated at a temperature between 175 and 275° C. in the absence of oxygen until the desired viscosity is obtained.

6. As a new composition of matter a polymer drying oil of butadiene-1,3 which has been prepared by the use of sodium as a catalyst and synthesized to an intrinsic viscosity below that ultimately desired and then subsequently heated at a temperature between 175° and 275° C. in the absence of oxygen until the desired viscosity is obtained.

7. A process for improving a synthetic drying oil which comprises preparing a polymer drying oil of butadiene-1,3 with sodium as a catalyst in the presence of a diluent to an intrinsic viscosity below that ultimately desired and then subsequently heating the oil to a temperature between 175° and 275° C. in the absence of oxygen until the desired viscosity is obtained.

8. A process according to claim 7 wherein the drying oil is a sodium copolymer of about 75 to 85% butadiene-1,3 and 25 to 15% styrene.

ANTHONY H. GLEASON.
ROBERT F. LEARY.

References Cited in the file of this patent

UNITED STATES PATENTS

| Number | Name | Date |
|---|---|---|
| 1,827,285 | Ebert et al. | Oct. 13, 1931 |
| 1,832,450 | Ebert et al. | Nov. 17, 1931 |
| 2,527,768 | Schulze et al. | Oct. 1, 1950 |

FOREIGN PATENTS

| Number | Country | Date |
|---|---|---|
| 676,508 | France | Feb. 24, 1930 |